United States Patent
Mitomo et al.

(10) Patent No.: US 7,739,683 B2
(45) Date of Patent: Jun. 15, 2010

(54) METHOD AND SYSTEM FOR PROVIDING SOFTWARE MAINTENANCE SERVICE, AND COMPUTER PRODUCT

(75) Inventors: Masashi Mitomo, Kawasaki (JP); Satoru Torii, Kawasaki (JP); Etsuo Ono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1249 days.

(21) Appl. No.: 11/196,426

(22) Filed: Aug. 4, 2005

(65) Prior Publication Data

US 2006/0036718 A1 Feb. 16, 2006

Related U.S. Application Data

(63) Continuation of application No. PCT/JP03/01119, filed on Feb. 4, 2003.

(51) Int. Cl.
G06F 9/445 (2006.01)
(52) U.S. Cl. ..................................... 717/174
(58) Field of Classification Search ..................... None
See application file for complete search history.

(56) References Cited

U.S. PATENT DOCUMENTS

| | | | |
|---|---|---|---|
| 7,051,368 B1 * | 5/2006 | Howard et al. ............... 726/23 |
| 2002/0116631 A1 | 8/2002 | Torii et al. | |
| 2002/0133606 A1 | 9/2002 | Mitomo et al | |
| 2003/0226038 A1 * | 12/2003 | Raanan et al. ............... 713/201 |
| 2007/0150597 A1 * | 6/2007 | Hasan et al. ................. 709/226 |

FOREIGN PATENT DOCUMENTS

| | | |
|---|---|---|
| JP | 2002-55839 A | 2/2002 |
| JP | 2002-251374 | 9/2002 |
| JP | 2002-342279 | 11/2002 |

OTHER PUBLICATIONS

Ryosuke Sato, A Study on Dynamic Reconfiguration System to Keep a Network in a Secure Condition, vol. 2002, No. 12 IPSJ SIG Notes Information Processing Society of Japan, Feb. 15, 2002, pp. 169-174.
Yasuaki Kamidori, "Latest Trend of Security", Business Communication, vol. 39, (12), Japan, Business Communication, Inc., Dec. 1, 2002, pp. 111-114.
Japanese Office Action issued on Jan. 27, 2009 in corresponding Japanese Patent Application 2004-567862.
Katsuaki Kato, "You are targeted!? Internet Security Circumstances in Constant Connection Days", DOS/V Special vol. 6, p. 60, 2001.

* cited by examiner

Primary Examiner—Ted T Vo
Assistant Examiner—Philip Wang
(74) Attorney, Agent, or Firm—Staas & Halsey LLP

(57) ABSTRACT

In a system for providing software maintenance service, a server includes: a storage unit that stores a determination rule for determining whether to deny a process request to the faulty software; and a transmitting unit that transmits the determination rule to the client. The client includes: a determination-rule receiving unit that receives the determination rule; a process-request receiving unit that receives the process request; and a determining unit that determines whether to deny the process request based on the determination rule.

8 Claims, 18 Drawing Sheets

FIG.2

| ID NUMBER OF DETERMINATION RULE | DETERMINATION RULE |
|---|---|
| 1 | (deny, { cgi_name, equal "phf" } ) |
| 2 | (deny, { cgi_argument "input 1", is longer than 128 } ) |
| 3 | (deny, { { cgi_name equal "bbs.pl" } and { cgi_argument "input 1", is longer than 128 } } ) |
| . . . | . . . |

FIG.4

| SETUP ENVIRONMENT | ID NUMBER OF NECESSARY DETERMINATION RULE |
|---|---|
| SERVER PROCESS SOFTWARE VERSION 2.1 | 1-20, 22-24, 26, 33-45 |
| SERVER PROCESS SOFTWARE VERSION 2.2 | 1-20, 22-24, 26, 33-37 |
| SERVER PROCESS SOFTWARE VERSION 2.2 + CORRECTION PROGRAM 1001 | 1-20, 22-24, 26 |
| . . . | . . . |

METHOD AND SYSTEM FOR PROVIDING SOFTWARE MAINTENANCE SERVICE, AND COMPUTER PRODUCT

This application is a continuing application, filed under 35 U.S.C. §111 (a), of International Application PCT/JP03/1119, filed Feb. 4, 2003.

BACKGROUND OF THE INVENTION

1. Field of the Invention

The present invention relates to a technology for providing software maintenance service for a software installed in a computer connected to a network.

2. Description of the Related Art

Software has been complicated and extensive and the development period for the software has been shortened in recent years. With these circumstances, a burden of software design and program coding on software vendors that develop and distribute software has been growing year by year.

Therefore, the software developed and distributed under these circumstances has potentially many design errors and program code errors, and software faults due to these errors may cause serious damage to users who use the software.

A fault related to security of the software in particular is called "vulnerability" or "security hole" (hereinafter, "security hole"), and third parties having no authorized right to access a computer use the security hole to make unauthorized accesses to the computer. Such accesses as above are rapidly increasing.

In general, if such a fault is found, the software vendor develops a correction program to correct a relevant program code that causes the fault (it is sometimes called "updater" or "patch"), and releases the correction program to the users without charge. The user acquires the correction program released and causes the computer to execute it, and the program code is thereby corrected.

When the correction program is released, to solve the software fault, the user has to acquire the correction program released as quickly as possible and cause the computer to execute it and to correct the program code. As a technology to correct the program code as quickly as possible, a device as follows is disclosed. The device automatically performs acquisition of a correction program for software having a fault and correction of the software by the correction program acquired (see Japanese Patent Application Laid-Open No. H11-272454).

However, when the fault is found in the software, the software vendors generally release a correction program for the fault to the users in the following steps. At first, the software vendor reproduces a symptom of the fault, creates a correction program to correct the fault, examines the correction program created, confirms that the correction program surely fixes the software fault and exerts no effect on the rest of a program other than the fault, and releases the correction program after all these steps. Therefore, a long period of time is required from finding the software fault to releasing the correction program. Consequently, the conventional technology disclosed in Japanese Patent Application Laid-Open No. H11-272454 has a problem such that the correction program cannot quickly be provided to the users. Therefore, the users have no other choice but leave the program code uncorrected until the correction program is created, and may be damaged due to occurrence of the software fault during this period.

As a method of preventing unauthorized access using the security hole, it is general to build a firewall. More specifically, source information such as an IP address of a computer, from which the unauthorized access is made, is found out from its access log, and the firewall performs a process for denying an access request, as unauthorized access, from the computer that includes the source information.

In this method, however, it is impossible to deny an access from a computer until the access from the computer is verified as unauthorized access. Another device as follows is therefore disclosed. The device checks whether an access from a computer matches any known pattern indicating unauthorized access, and denies the access as unauthorized access if there is a match (see Japanese Patent Application Laid-Open No. 2002-342279).

However, even if the conventional technology disclosed in Japanese Patent Application Laid-Open No. 2002-342279 is used, there still remains some problems on how to quickly and efficiently acquire an unauthorized access pattern that is created to deal with new unauthorized access and how to protect against the unauthorized access.

SUMMARY OF THE INVENTION

It is an object of the present invention to at least solve the problems in the conventional technology.

A system according to an aspect of the present invention is a system for providing software maintenance service for faulty software installed in a client connected to a server via a network. The server includes: a storage unit that stores a first determination rule for determining whether to deny a process request to the faulty software; and a transmitting unit that transmits the first determination rule to the client. The client includes: a determination-rule receiving unit that receives the first determination rule; a process-request receiving unit that receives the process request; and a determining unit that determines whether to deny the process request based on the first determination rule.

A method according to another aspect of the present invention, which is a method of providing software maintenance service for faulty software installed in a client connected to a server via a network, includes: transmitting including the server transmitting a first determination rule for determining whether to deny a process request to the faulty software to the client; receiving including the client receiving the first determination rule; receiving including the client receiving the process request; and determining including the client determining whether to deny the process request based on the first determination rule.

A computer-readable according to still another aspect of the present invention stores a computer program that causes the server or the client to execute the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a diagram of an example of a data structure of a determination rule as shown in FIG. 1;

FIG. 4 is a diagram of an example of a data structure of setup-environment support information as shown in FIG. 3;

DETAILED DESCRIPTION OF THE PREFERRED EMBODIMENTS

Exemplary embodiments of the present invention are explained in detail below with reference to the accompanying drawings. In the first and the second embodiments, a case where there is a security hole in server process software that provides services for Web pages to a client computer is explained.

Figure 1:
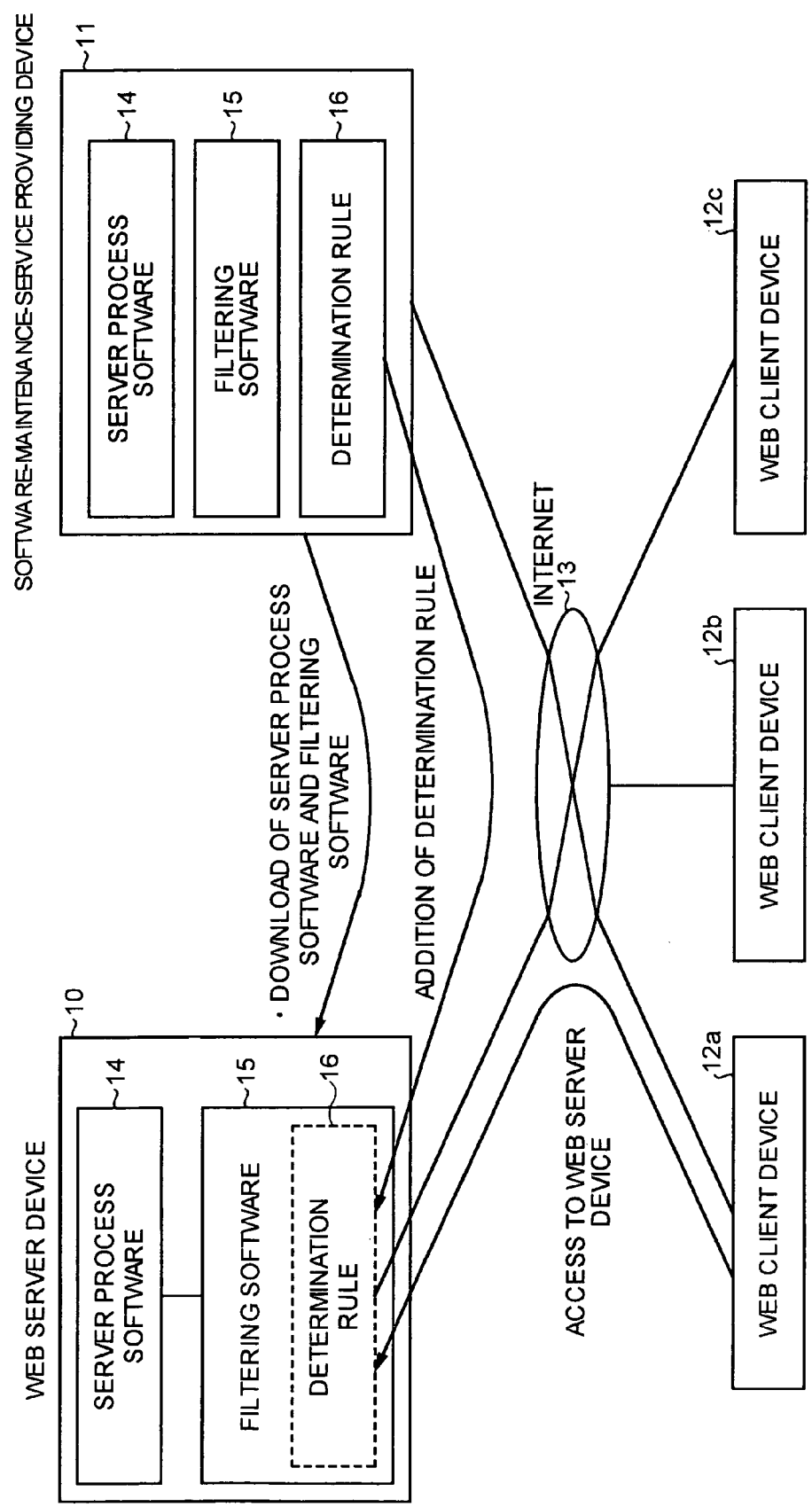
FIG. 1 is a diagram of an overall system configuration of a software-maintenance-service providing system according to a first embodiment of the present invention.
Figure 9:
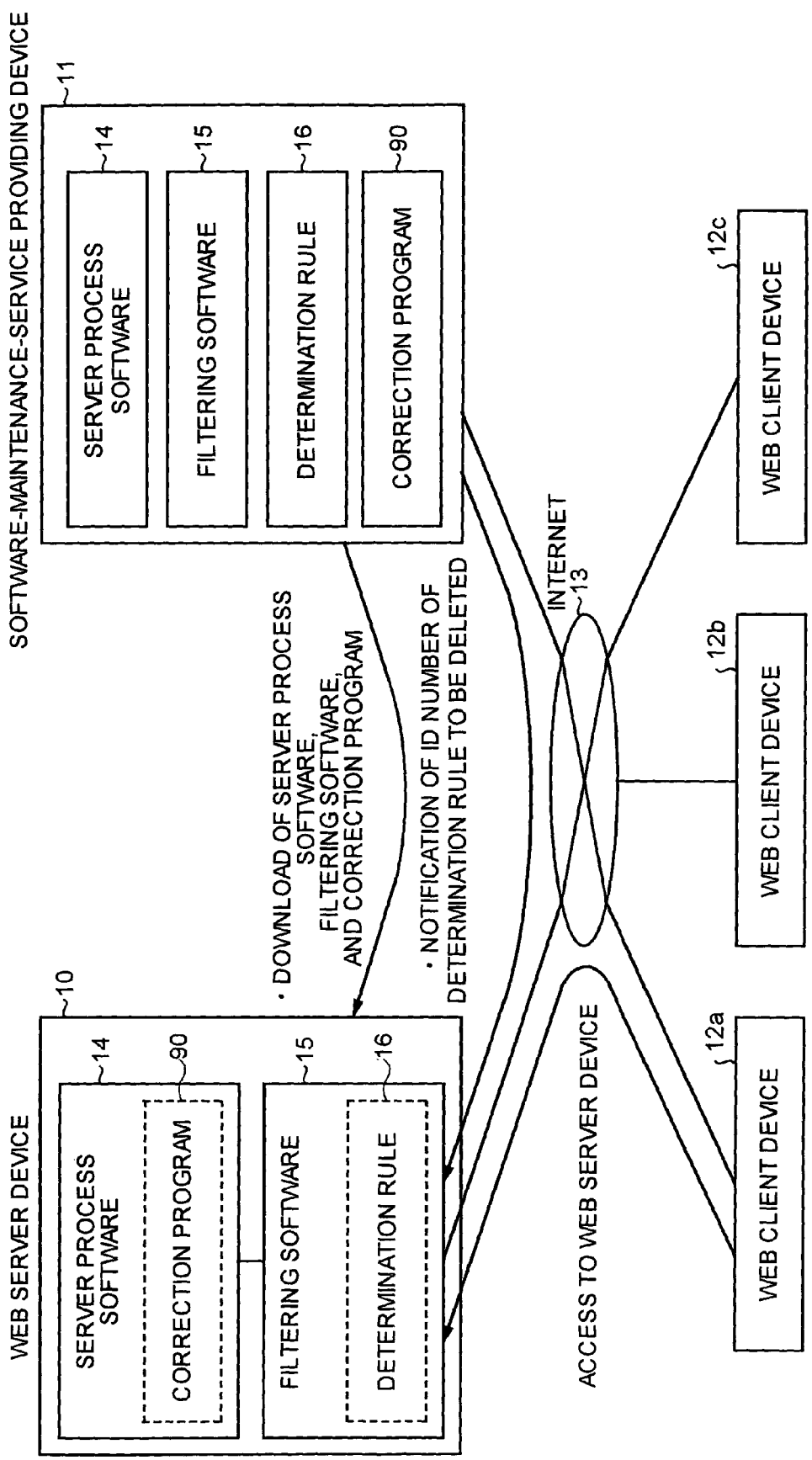
FIG. 9 is a diagram of an overall system configuration of a software-maintenance-service providing system system in which a third party provides filtering software and a determination rule.
Figure 10:
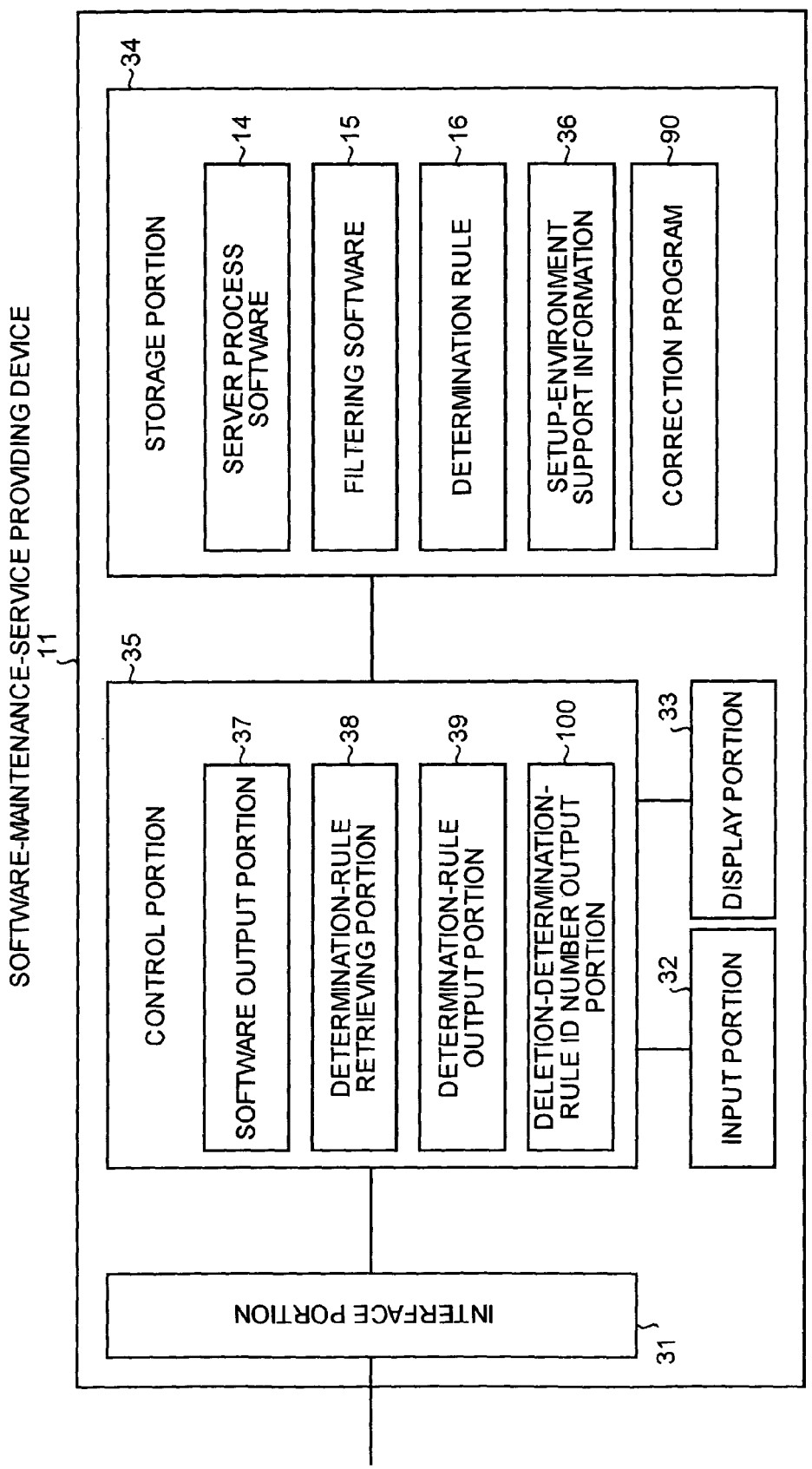
Figure 11:
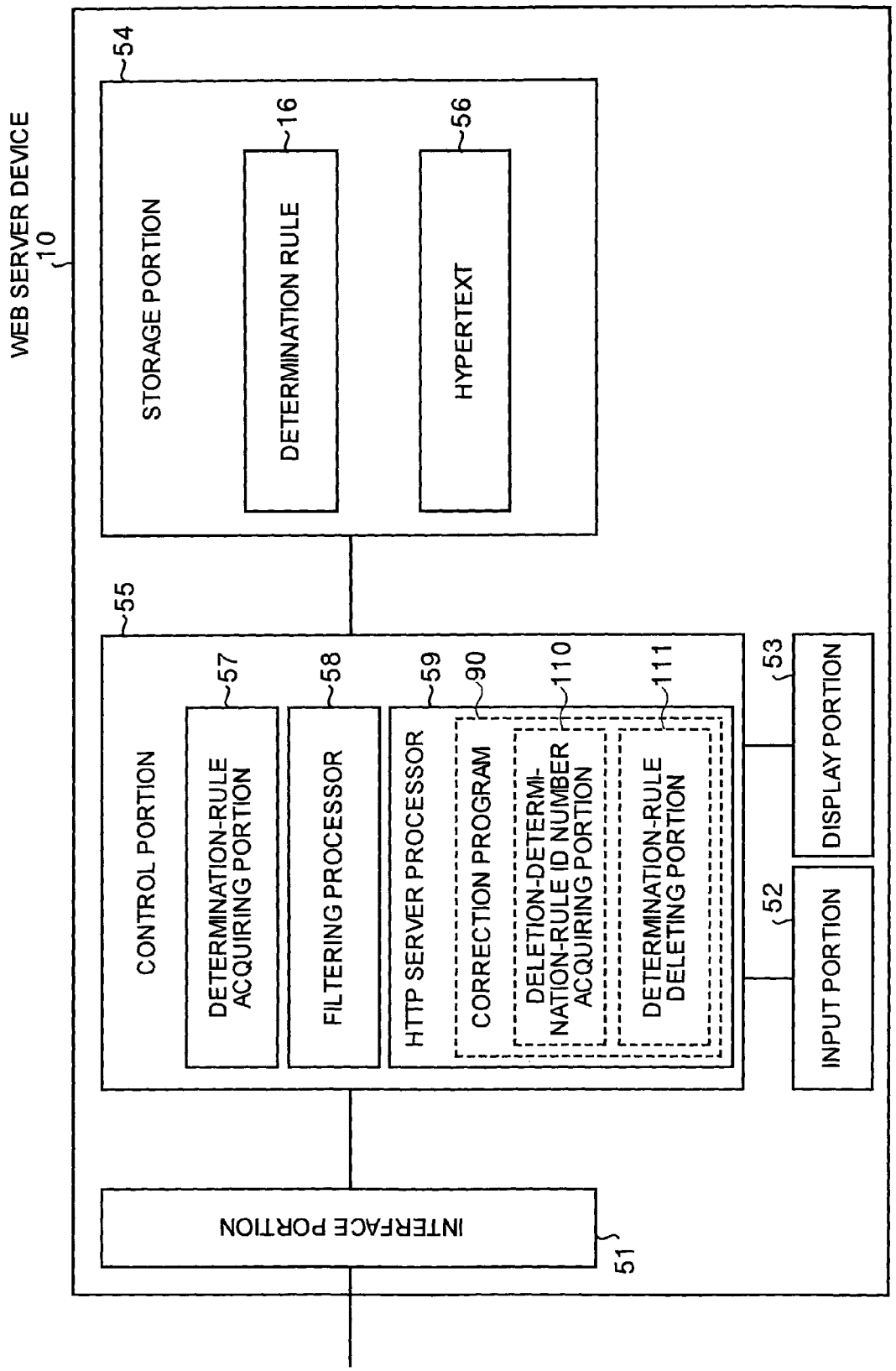
Figure 12:
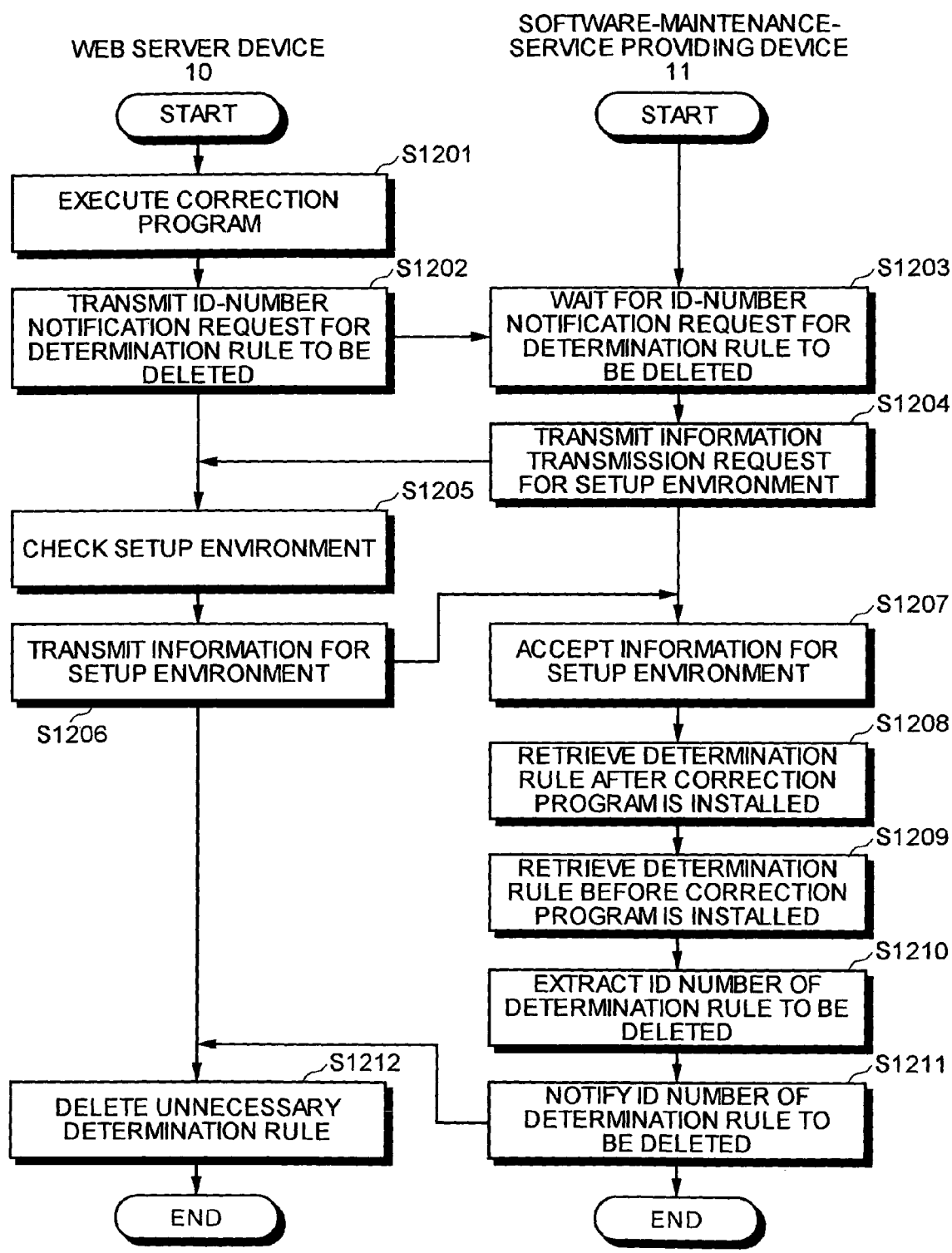
Figure 13:
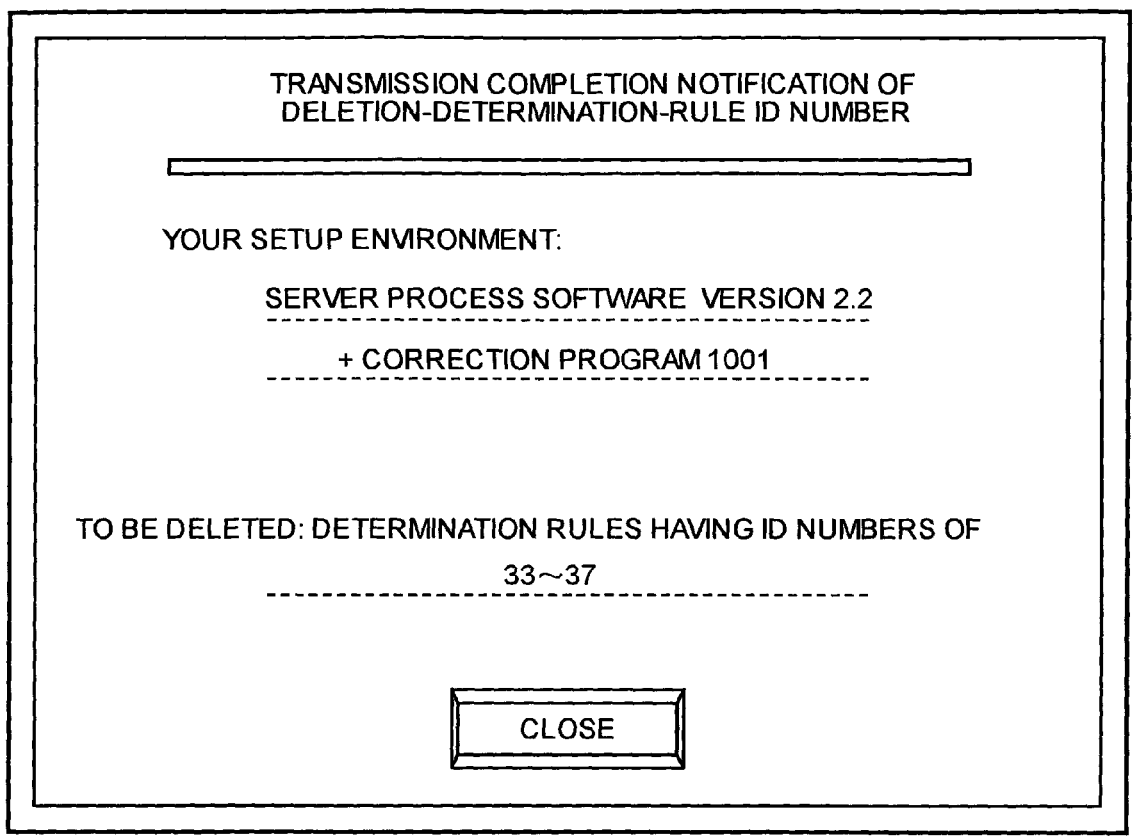
Figure 14:
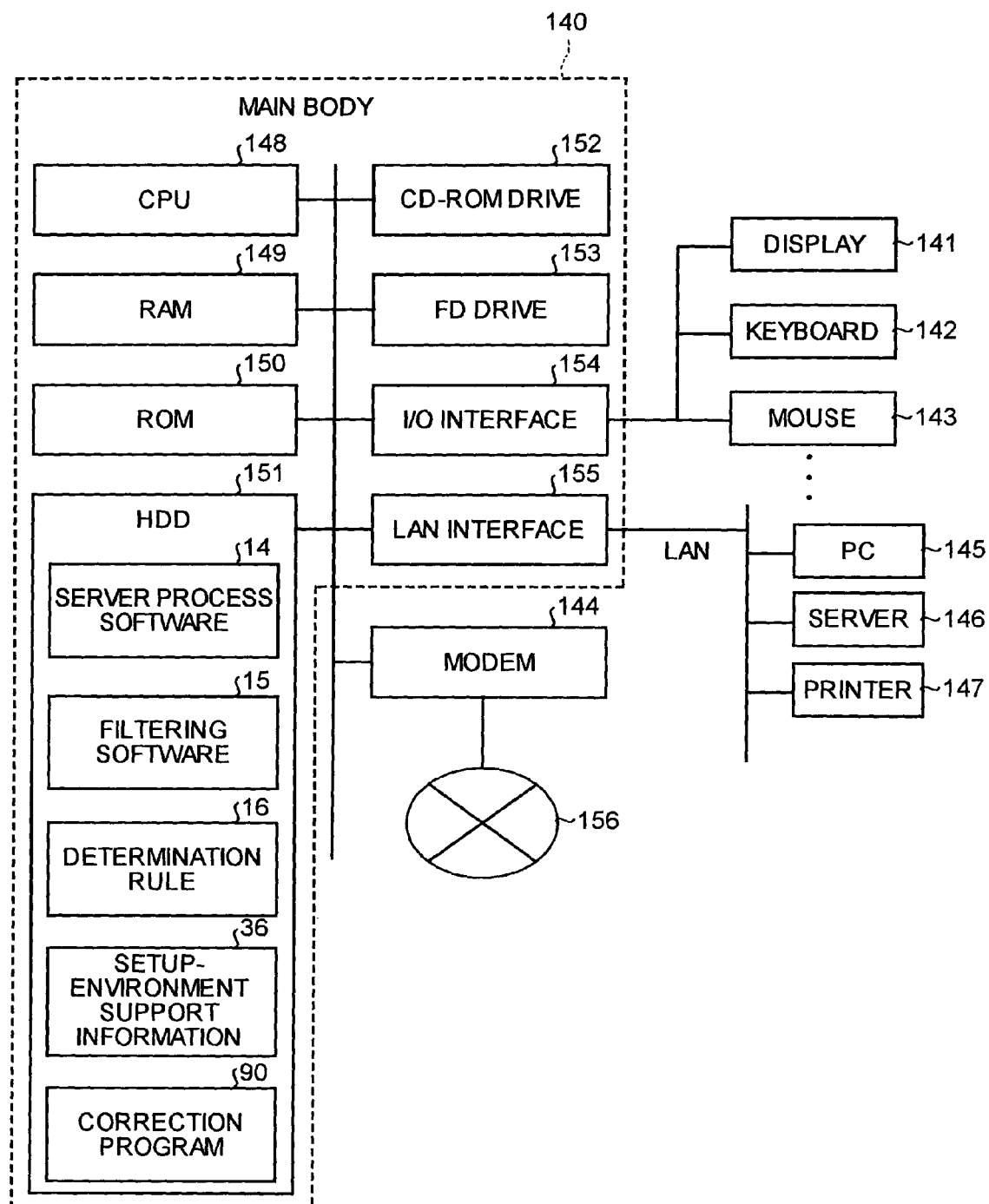
Figure 15:
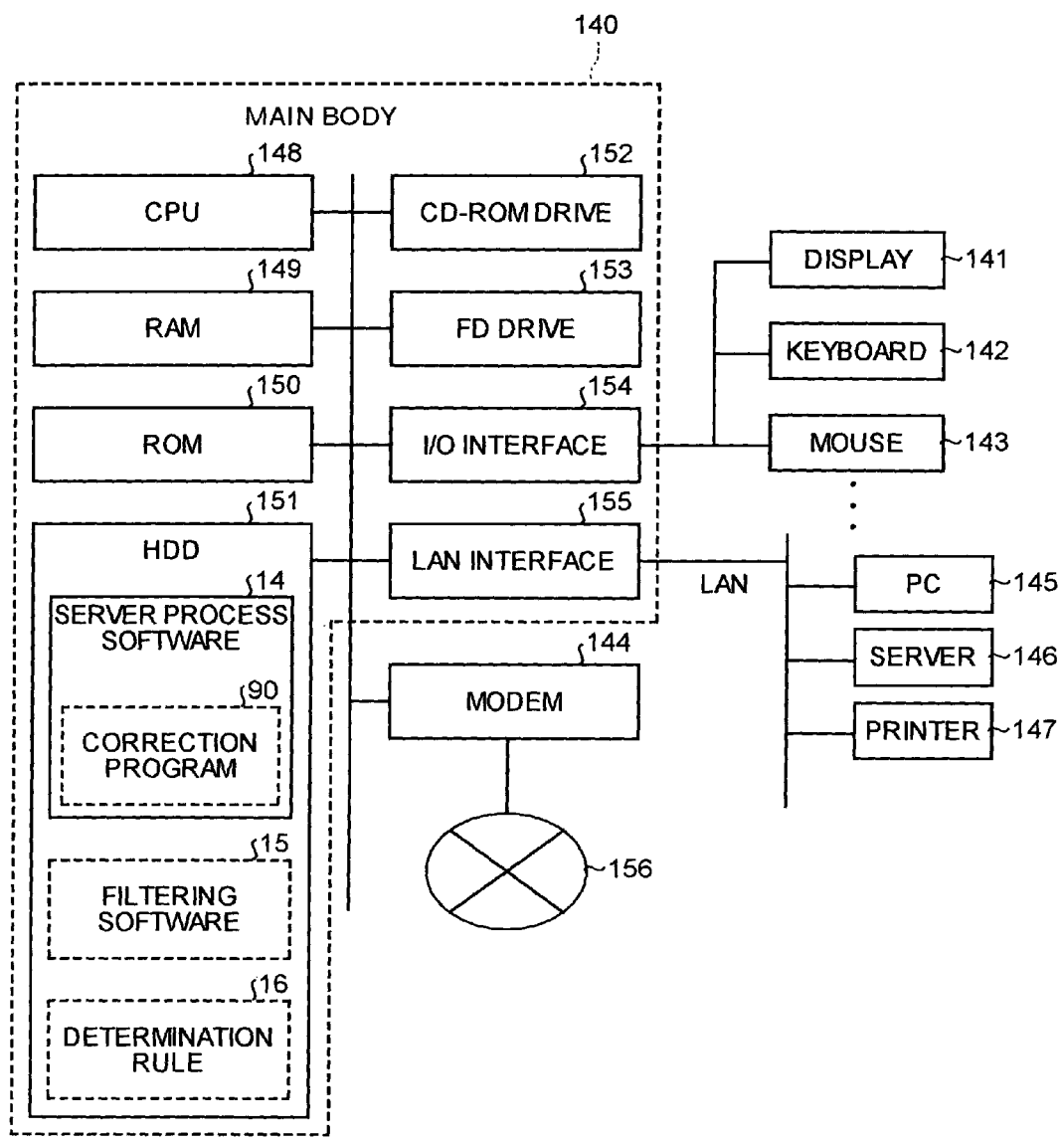
Figure 16:
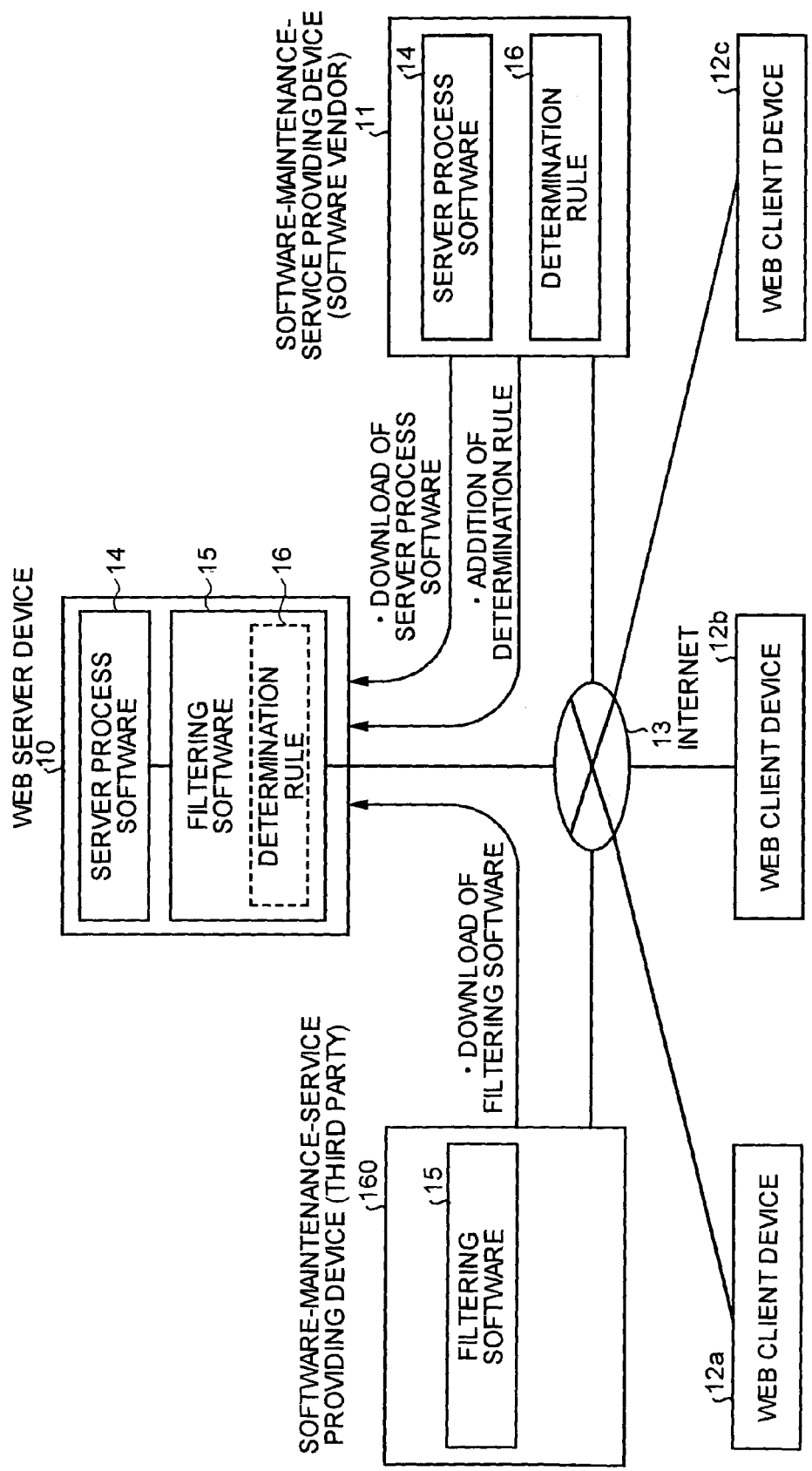
Figure 17:
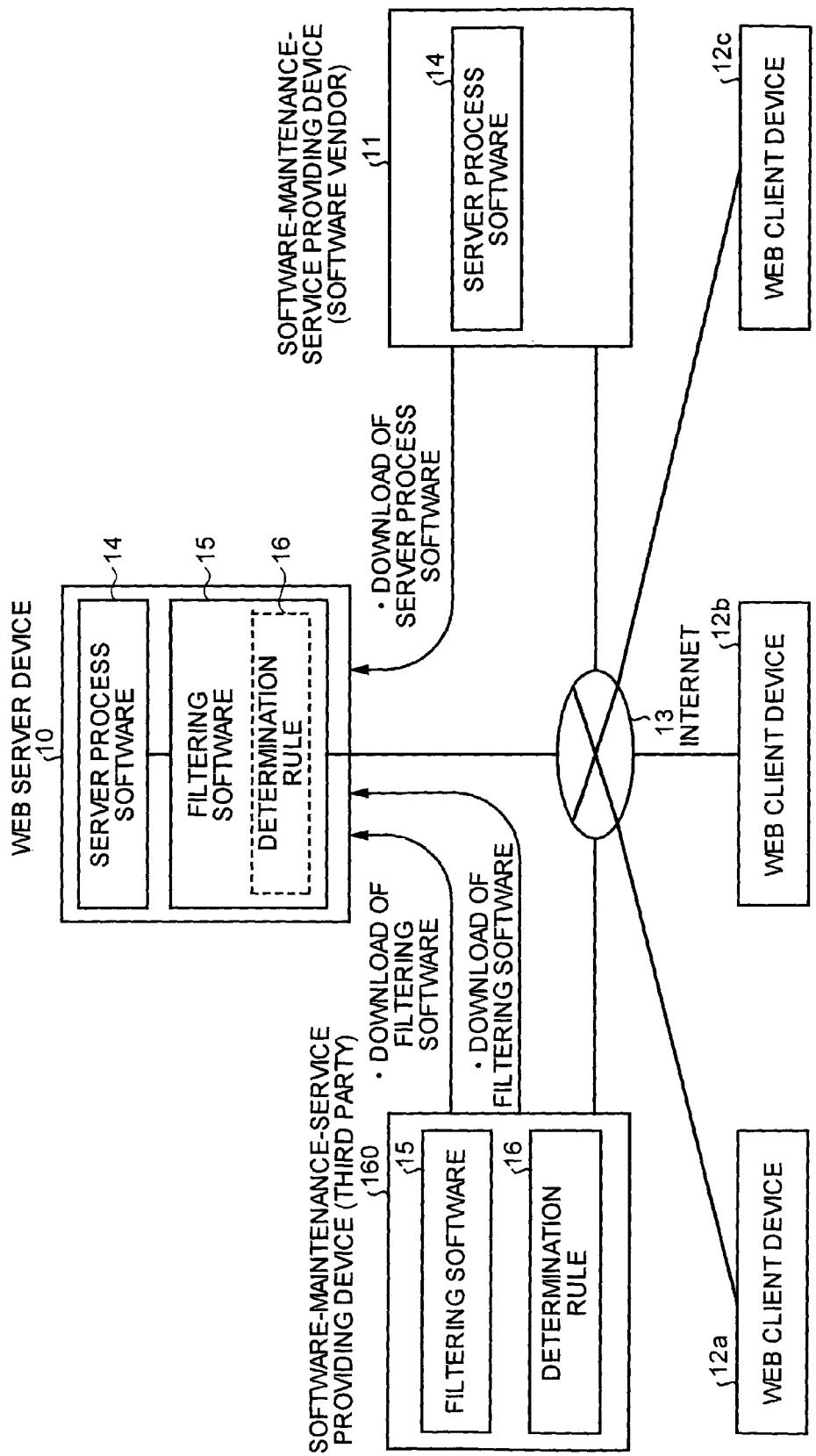

FIG. 1 is a diagram of the overall system configuration of the software-maintenance-service providing system according to the first embodiment. The software-maintenance-service providing system includes computers that serve as a Web server device 10 on which server process software 14 is installed, a software-maintenance-service providing device 11 disposed in a software vendor that develops the server process software 14, and Web client devices 12a to 12c used by ordinary users, the computers being connected to one another through Internet 13. Here, for convenience in explanation, the computers according to a second embodiment of the present invention;

FIG. 10 is a functional block diagram of a configuration of a software-maintenance-service providing device as shown in FIG. 9;

FIG. 11 is a functional block diagram of a configuration of a Web server device as shown in FIG. 9;

FIG. 12 is a flowchart of process procedures for a delete process of deleting a determination rule in the software-maintenance-service providing system according to the second embodiment;

FIG. 13 is a diagram of an example of a screen displayed on the Web server device when an ID number of the determination rule to be deleted is transmitted to the Web server device as shown in FIG. 11;

FIG. 14 is a diagram of a hardware configuration of the software-maintenance-service providing device according to the first embodiment and the second embodiment;

FIG. 15 is a diagram of a hardware configuration of the Web server device according to the first embodiment and the second embodiment;

FIG. 16 is a diagram of an overall system configuration of a software-maintenance-service providing system in which a third party provides filtering software;

FIG. 17 is a diagram of an overall system configuration of a software-maintenance-service providing are connected to one another through the Internet 13, but they may be connected through a network such as a local area network (LAN) or a wide area network (WAN). The Web server device 10 forms a terminal device according to the present invention that serves as a client provided with software maintenance service by the software-maintenance-service providing device that serves as a server.

The Web server device 10 is a HyperText Transfer Protocol (HTTP) server device that uses the server process software 14 to provide various pieces of information described in a markup language such as HyperText Markup Language (HTML) to the Web client devices 12a to 12c.

However, it is found that the server process software 14 has a security hole, and to protect against the security hole, filtering software 15 created by the software vendor is downloaded from the software-maintenance-service providing device 11 and installed on the Web server device 10. The filtering software 15 is also possible to be installed from a portable recording medium such as a flexible disk (FD), CD-ROM, a DVD disk, a magneto-optical disk, and an IC card.

The filtering software 15 receives an HTTP request to the server process software 14 when any one of the Web client devices 12a to 12c makes an access to the Web server device 10, and denies the HTTP request if it is the one defined in determination rule 16 created by the software vendor so as to be denied. Furthermore, the filtering software 15 is provided in each software, but it is not limited thereto. The filtering software 15 can also be configured as a single unit to target a plurality of software so as to deny the accesses to the plurality of software targeted.

The determination rule mentioned here specifies determination criteria to determine whether an input from an external device to the software is to be denied or allowed, if the software installed on the Web server device 10 has any fault. The determination rule is created by an administrator or the like of the software-maintenance-service providing device 11 to protect against a security hole when the security hole is found in the software such as the server process software 14 that is mounted on the Web server device 10. However, the software-maintenance-service providing device 11 may also be configured to determine the contents of the security hole found and automatically generate a determination rule.

FIG. 2 is a diagram of an example of the data structure of the determination rule 16 of FIG. 1. The data structure of the determination rule 16 consists of ID numbers of individual determination rules and corresponding determination rules. Each of the determination rules generally has a structure as follows.

(Instruction, {Determination Criteria})

An instruction indicates whether an access such as an HTTP request from an external device is to be denied or allowed. Each of determination criteria is a condition determined to perform access denial or access allowance as the instruction. For example, as shown in FIG. 2, the determination rule having the ID number of 1 indicates that an HTTP request is denied if the HTTP request is sent from any one of the Web client devices 12a to 12c that specifies a Common Gateway Interface (CGI) program having a file name of "phf". This denial allows workaround of occurrence of such a situation that starting the CGI program having the file name of "phf" causes unauthorized access to the server process software.

Here, "deny" is an instruction that instructs to deny the HTTP request if the determination criteria surrounded by "{" and "}" are satisfied. The determination criteria surrounded by "{" and "}" consist of a determination target (here, cgi_name) and a determination equation (here, equal "phf").

The determination rule having the ID number of 2 indicates that an HTTP request for an argument of the CGI program (argument name input 1) is denied if the HTTP request is an input having a character string longer than 128 characters. The determination rule having the ID number of 3 indicates that an HTTP request is denied if a file name of the CGI program specified is "bbs.pl" and the HTTP request for an argument of the CGI program (argument name input 1) is an input having a character string longer than 128 characters.

Here, "and" is used to connect two determination criteria, and when the two determination criteria are concurrently satisfied, the instruction "deny" is executed. A connector "or" can also be used instead of "and". The connector "or" connects the two determination criteria, and the instruction is executed when at least one of the determination criteria connected is satisfied. The number of determination rules can be unlimitedly defined as shown in FIG. 2.

Referring back to FIG. 1, the software-maintenance-service providing device 11 provides maintenance service for the server process software 14 having a security hole, to the Web server device 10. In the software-maintenance-service providing device 11, the determination rule 16 is created by the software vendor and referred to by the filtering software 15, and specifies various inputs which are to be denied. The determination rule 16 is accumulated in a database, and is released to the users (here, administrator of the Web server device 10) of the server process software 14 having the security hole. Download services of the server process software 14 and the filtering software 15 created by the software vendor are also provided to the users.

Each of the Web client devices 12a to 12c is an Internet terminal device from which an ordinary user accesses the Web server device 10 using a Web browser installed on the Web client device, and which exchanges information with the server process software 14.

The administrator of the Web server device 10 can download any one of the determination rule 16 released that is necessary and sufficient for setup environment for the server process software 14, from the software-maintenance-service providing device 11, and install it on the filtering software 15.

The setup environment means a version of the server process software 14 and a type and a version of related software required for execution of the server process software 14. Examples of the related software mainly include a shared program (DLL: Dynamic Link Library), OS, application software, various drivers, plug-in, and correction programs (patch, updater). In addition to these, it is also possible to include a program or the like requiring the server process software 14.

The determination rule 16 only describes patterns of HTTP requests by unauthorized accesses using security holes and defines denial of any HTTP request received if the HTTP request has the same pattern as one of the patterns. This arrows creation of the determination rule 16 in a shorter period of time as compared with the case of creating a correction program for correcting the server process software 14 itself. Thus, it is possible to protect against the security hole more quickly and prevent damage to the Web server device 10.

Figure 3:
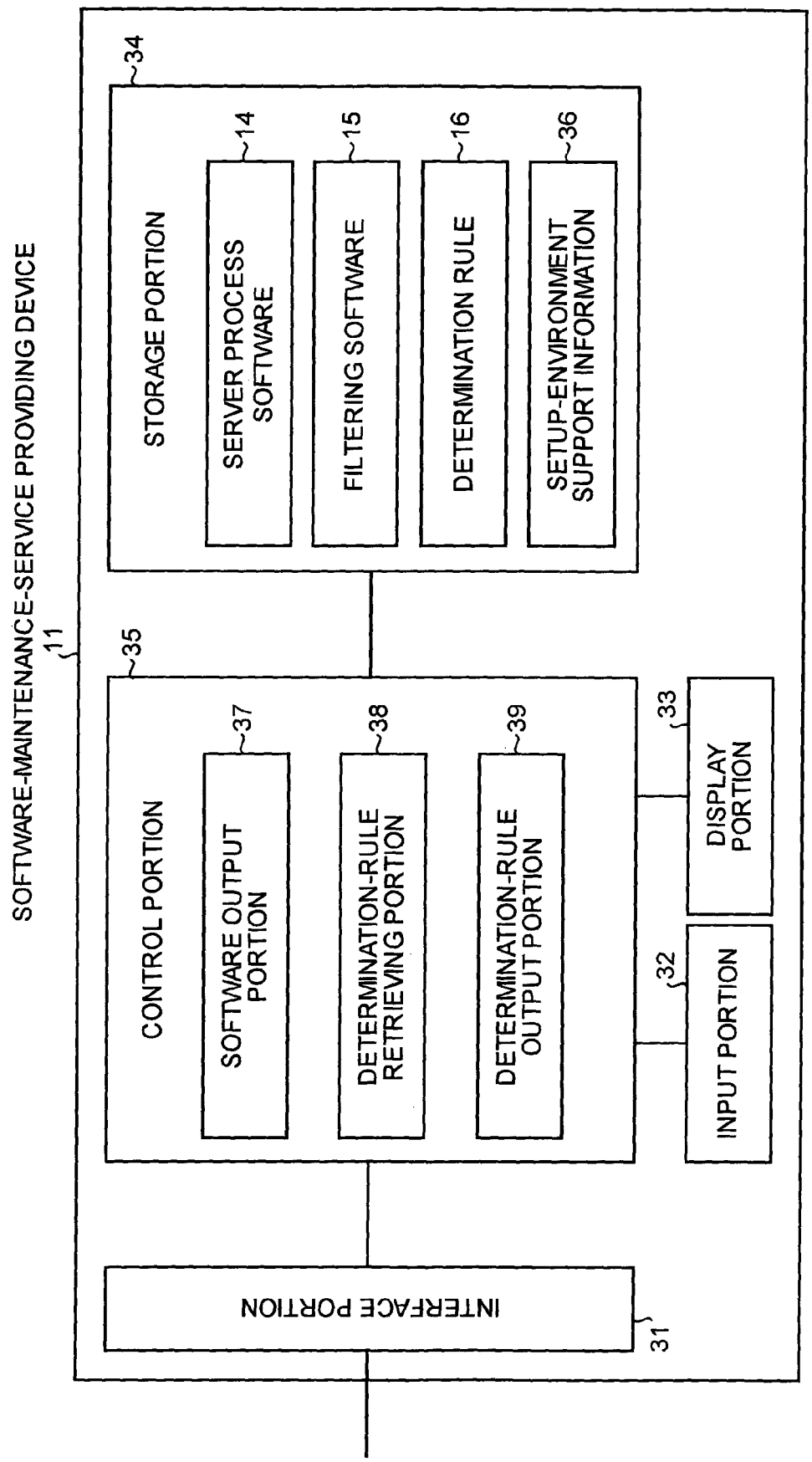
FIG. 3 is a functional block diagram of a configuration of a software-maintenance-service providing device as shown in FIG. 1.

FIG. 3 is a functional block diagram of the configuration of the software-maintenance-service providing device 11 of FIG. 1. The software-maintenance-service providing device 11 includes an interface portion 31, an input portion 32, a display portion 33, a storage portion 34, and a control portion 35. The interface portion 31 is a network interface that exchanges data with the Web server device 10 through the Internet 13. Specifically, the interface portion 31 performs processes according to TCP/IP protocol.

The input portion 32 is an input device such as a keyboard and a mouse, and can perform an input or the like of the determination rule 16 created by the software vendor. The display portion 33 is a display device such as a display and a liquid crystal panel. The storage portion 34 is a storage device (storage unit) such as a hard disk drive.

The storage portion 34 stores the server process software 14, the filtering software 15, the determination rule 16, and setup-environment support information 36. The server process software 14, the filtering software 15, and the determination rule 16 can be downloaded to the Web server device 10. Determination rules created by the software vendor so as to protect against a newly found security hole are successively added to the determination rule 16. The server process software 14, the filtering software 15, and the determination rule 16 have already been explained with reference to FIG. 1 and FIG. 2, and therefore, explanation thereof is omitted.

The setup-environment support information 36 is a data file that stores the setup environment for the server process software 14 having the security hole and the ID number of a determination rule necessary to deal with the security hole under the setup environment, these two being stored as a group.

FIG. 4 is a diagram of an example of the data structure of the setup-environment support information 36 of FIG. 3. The setup-environment support information 36 consists of a group of setup environment information and ID numbers of determination rules required for the setup environment.

The example indicates that determination rules having ID numbers of 1 to 20, 22 to 24, 26, and 33 to 45 are required for the server process software 14 of which version having a security hole is 2.1, to deal with the security hole. The example also indicates that determination rules having ID numbers of 1 to 20, 22 to 24, 26, and 33 to 37 are required for the server process software 14 of which version is 2.2.

The example further indicates that determination rules having ID numbers of 1 to 20, 22 to 24, and 26 are required for the server process software 14 of which version is 2.2 under the setup environment in which a correction program allocated a number "1001" is installed. This indicates a situation such that the installation of the correction program 1001 allows solution of a part of the security hole in the server process software 14 and there is no more need to use the determination rules 33 to 37.

By referring to such setup-environment support information 36, the software-maintenance-service providing device 11 can output determination rules that are necessary and sufficient for the setup environment for the server process software 14, to the Web server device 10, and the determination rules output can be installed on the filtering software 15. Any number of groups of setup environment and ID numbers of determination rules required for the setup environment can be defined as shown in FIG. 4.

Referring back to FIG. 3, the control portion 35 is a control unit that controls the entire software-maintenance-service providing device 11, and includes a software output portion 37, a determination-rule retrieving portion 38, and a determination-rule output portion 39.

The software output portion 37 is an output portion that outputs the server process software 14 or the filtering software 15 to the Web server device 10 if download of either one of the two is requested from the Web server device 10. The determination-rule retrieving portion 38 is a retrieving portion (retrieving unit) that retrieves any one of the determination rule 16 from the storage portion 34, the determination rule retrieved corresponding to the setup environment for the server process software 14 installed on the Web server device 10.

The determination-rule output portion 39 is an output portion (output unit) that transmits one of the determination rule 16 retrieved by the determination-rule retrieving portion 38 to the Web server device 10. When the transmission of the one of the determination rule 16 is finished, the determination-rule output portion 39 also sends notification to that effect to the Web server device 10.

Figure 5:
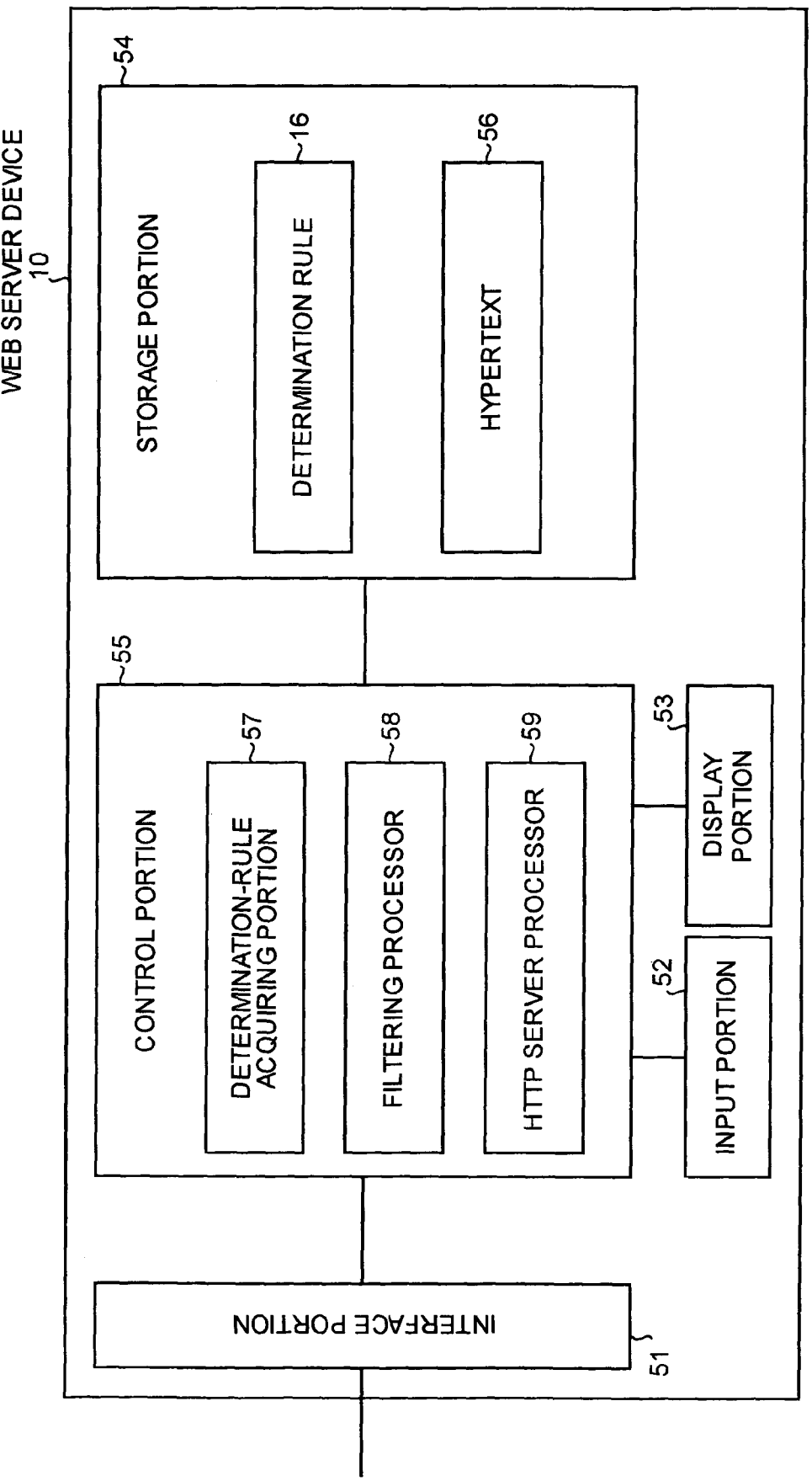
FIG. 5 is a functional block diagram of a configuration of a Web server device as shown in FIG. 1.

FIG. 5 is a functional block diagram of the configuration of the Web server device 10 as shown in FIG. 1. The Web server device 10 includes an interface portion 51, an input portion 52, a display portion 53, a storage portion 54, and a control portion 55.

The interface portion 51 is a network interface that exchanges data with the software-maintenance-service providing device 11 and the Web client devices 12a to 12c through the Internet 13, and performs specifically the processes according to TCP/IP protocol.

The input portion 52 is an input device such as a keyboard and a mouse. The display portion 53 is a display device such as a display and a liquid crystal panel. The storage portion 54 is a storage device (determination-rule storage unit) such as a hard disk drive. The storage portion 54 stores the determination rule 16 and hypertext 56.

The determination rule 16 is obtained by storing a determination rule or determination rules by downloading them that are output through the Internet 13 by the determination-rule output portion 39 of the software-maintenance-service providing device 11. The determination rules stored correspond to the setup environment for the server process software 14. The hypertext 56 is hypertext used to form a window screen that is distributed to the Web client devices 12a to 12c.

The control portion 55 is a control unit that controls the entire Web server device 10, and includes a determination-rule acquiring portion 57, a filtering processor 58, and an HTTP server processor 59.

The determination-rule acquiring portion 57 forms a determination-rule acquiring unit according to the present invention, and acquires any one of the determination rule 16 necessary and sufficient for the setup environment for the server process software 14 having a security hole, from the software-maintenance-service providing device 11.

More specifically, the determination-rule acquiring portion 57 performs processes for accepting a request to download the determination rule 16 from the administrator of the Web server device 10, finding out the setup environment for the server process software 14, transmitting information found out to the software-maintenance-service providing device 11, and then, storing the determination rule 16 that corresponds to the setup environment and is output from the software-maintenance-service providing device 11, in the storage portion 54.

The filtering processor 58 receives an HTTP request to the server process software 14 when any one of the Web client devices 12a to 12c accesses the Web server device 10, checks whether the HTTP request is the one defined in the determination rule 16 so as to be denied, and denies the HTTP request if it is the request defined so as to be denied. The functions of the determination-rule acquiring portion 57 and the filtering processor 58 are realized by the filtering software 15 installed on the Web server device 10.

The HTTP server processor 59 is a processor that provides a function as an HTTP server to the Web client devices 12a to 12c. More specifically, when accepting an access from any one of the Web client devices 12a to 12c, the HTTP server processor 59 performs processes for reading the hypertext 56 stored in the storage portion 54 and transmitting the hypertext 56 to the corresponding one of the Web client devices 12a to 12c.

Figure 6:
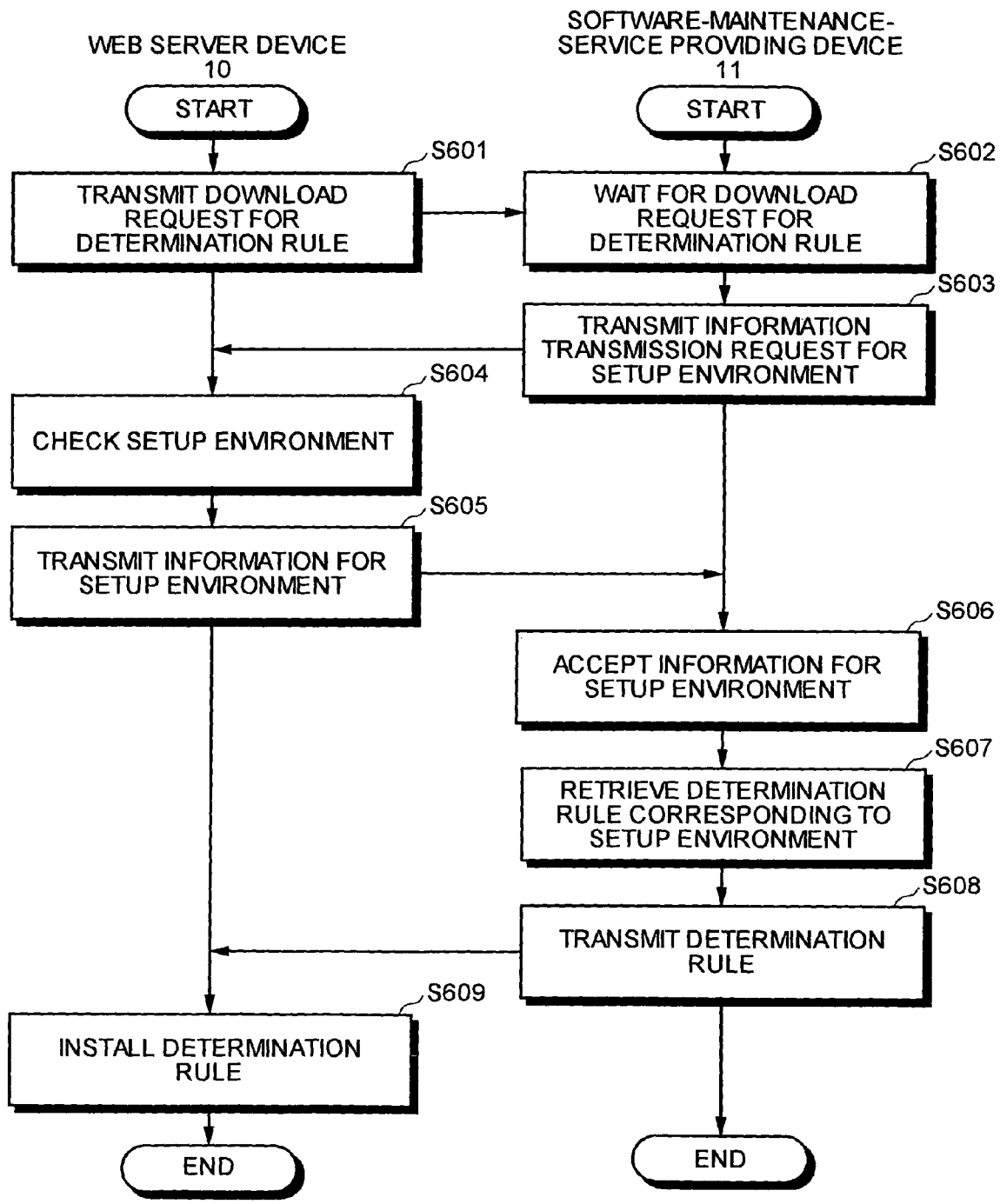
FIG. 6 is a flowchart of process procedures for an installation process of the determination rule in the software-maintenance-service providing system according to the first embodiment.

FIG. 6 is a flowchart of the process procedures for an installation process of the determination rule in the software-maintenance-service providing system according to the first embodiment. The Web server device 10 makes a download request while the software-maintenance-service providing device 11 is waiting for a download request for the determination rule 16 (steps S601 and S602). At that time, the Web server device 10 also transmits information related to the determination rule 16 already acquired.

The software-maintenance-service providing device 11 that has accepted the request sends a request to the Web server device 10 so as to transmit information on the setup environment for WEB server software having a security hole (step S603).

The Web server device 10 checks the setup environment (step S604), and transmits the information for the setup environment acquired through the check, to the software-maintenance-service providing device 11 (step S605). More specifically, the check of the setup environment can be preformed by referring to a set file or the like that describes the setup environment for the software (e.g., a registry file in Windows™).

The software-maintenance-service providing device 11 accepts the information for the setup environment transmitted from the Web server device 10 (step S606), retrieves a determination rule corresponding to the information from the setup-environment support information 36 (step S607), and transmits one of the determination rule 16 necessary and sufficient for the setup environment to the Web server device 10 (step S608).

The determination-rule acquiring portion 57 of the Web server device 10 installs the determination rule transmitted on the filtering software 15 as reference data (step S609), and determines whether an HTTP request to the server process software 14 is allowed or denied by referring to the one of the determination rule 16 acquired in the filtering processor 58. The determination-rule acquiring portion 57 installs the determination rule on the filtering software 15 by copying the determination rule transmitted and adding it to the last part of existing determination rules if the determination rules are already present, or by copying the determination rule transmitted as a new determination rule if no determination rule is present. At this time, it is also possible to sort the existing determination rules and the determination rule newly transmitted in time series order or in order of ID numbers of the determination rules, and to sort them by types of determination criteria.

Figure 7:
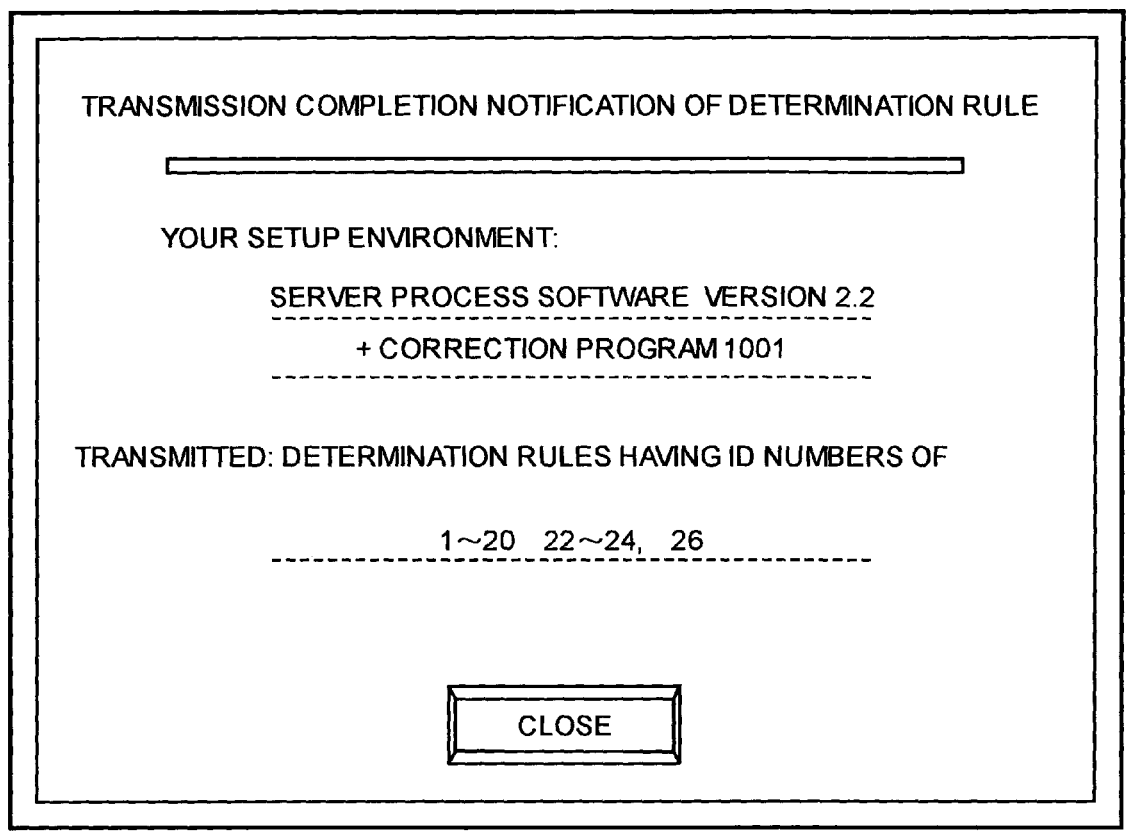
FIG. 7 is a diagram of an example of a screen displayed on the Web server device when the determination rule is transmitted to the Web server device of FIG. 3.

FIG. 7 is a diagram of an example of a screen displayed on the Web server device 10 when the determination rule 16 is transmitted to the Web server device 10 of FIG. 3. Displayed on the screen of the Web server device 10, as shown in FIG. 7, are the setup environment for the server process software 14 in the Web server device 10 (server process software version 2.2+correction program 1001) and a message indicating that transmission of one of the determination rule 16 corresponding to the setup environment is finished. This information is notified to the administrator of the Web server device 10.

Figure 8:
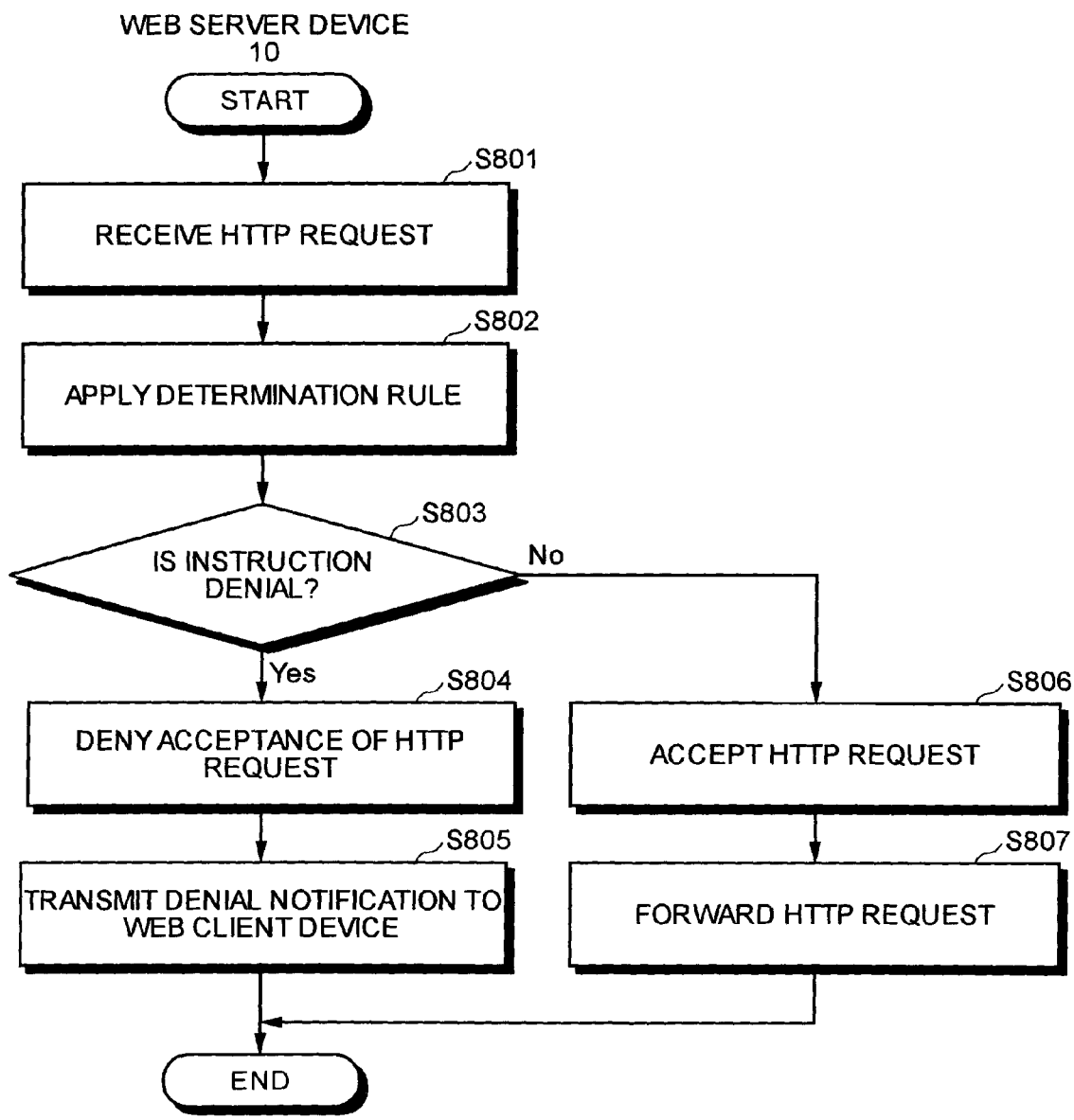
FIG. 8 is a flowchart of process procedures for a determination process of an HTTP request in filtering software according to the first embodiment.

FIG. 8 is a flowchart of the process procedures for the determination process of the HTTP request in the filtering software 15 according to the first embodiment. The filtering software 15, instead of the server process software 14, receives an HTTP request to the server process software 14 from any one of the Web client devices 12a to 12c (step S801). Then, the filtering software 15 applies the individual one of the determination rule 16 to the HTTP request (step S802), and checks whether the result of determination performed based on the determination rule 16 is a denial instruction (deny) (step S803).

If the result of determination is the denial instruction (step S803, Yes), the filtering software 15 denies the acceptance of the HTTP request to abandon the request (step S804), and does not forward the HTTP request to the server process software 14. The filtering software 15 transmits denial notification for the HTTP request to the corresponding one of the Web client devices 12a to 12c that has transmitted the HTTP request (step S805).

If the result of determination based on the determination rule 16 is not the denial instruction (step S803, No), the filtering software 15 accepts the HTTP request (step S806), and forwards it to the server process software 14 (step S807).

According to the first embodiment, the administrator of the Web server device 10 that uses the server process software 14 having the security hole installs the filtering software 15, downloads the determination rule 16 used to determine whether an input is denied, from the software-maintenance-service providing device 11 through the network, and installs the determination rule 16 downloaded on the filtering software 15. Therefore, when the security hole is found, the determination rule 16 for protection against it can be used quickly and efficiently, which makes it possible to prevent occurrence of damage to the Web server device 10 caused by the security hole.

In the first embodiment, the determination rule 16 is downloaded from the software-maintenance-service providing device 11 in response to the request from the Web server device 10, but the determination-rule acquiring portion 57 of the Web server device 10 may automatically transmit the download request at a preset time. This is easily realized by adding a function of transmitting the download request for the determination rule 16 to the software-maintenance-service providing device 11 at the preset time by using a timer device or a software timer.

Thus, it is possible to periodically check whether a new determination rule is added to the determination rule 16, and it is also possible to use the determination rule 16 for protecting against the security hole by being downloaded quickly and efficiently.

In the software-maintenance-service providing system explained in the first embodiment, the determination rule 16 created by the software vendor to protect against the security hole in the server process software 14 is installed on the filtering software 15 mounted on the Web server device 10, as the reference data. Furthermore, the software-maintenance-service providing system can be configured to automatically delete any one of the determination rule 16 that becomes unnecessary because the security hole is solved by installing the correction program.

According to a second embodiment of the present invention, any one of the determination rule 16 which becomes unnecessary due to installation of the correction program is deleted. In this case, the procedures for downloading the determination rule from the software-maintenance-service providing device 11 and installing the determination rule, as the reference data, on the filtering software 15 mounted on the Web server device 10 are the same as these of the first embodiment. Therefore, the process after the correction program is installed is explained below.

FIG. 9 is a diagram of the overall system configuration of the software-maintenance-service providing system. For convenience in explanation here, the same reference numerals are assigned to components of FIG. 9 that play the same roles as these of FIG. 1, and detailed explanation thereof is omitted.

As shown in FIG. 9, the administrator of the Web server device 10 uses the server process software 14 installed on the Web server device 10 that is connected to the Internet 13, and provides various pieces of information described in a markup language such as HTML to the Web client devices 12a to 12c used by ordinary users. However, it is found that there is a security hole in the server process software 14, and to deal with it, the filtering software 15 created by the software vendor is installed.

The software vendor creates a correction program 90 to protect against the security hole and notifies the administrator of the Web server device 10 by an electronic mail or the like so as to download the correction program 90. The administrator of the Web server device 10 downloads and executes the correction program 90 to correct a relevant program code of the server process software 14, which allows solution of the security hole.

Then the correction program 90 automatically transmits a notification request to the software-maintenance-service providing device 11 so as to notify the correction program 90 of an ID number of any one of the determination rule 16 which becomes unnecessary as a result of execution of the correction program 90. The software-maintenance-service providing device 11 that has accepted the notification request extracts the ID number of the one of the determination rule 16 that becomes unnecessary due to execution of the correction program 90 and that is to be deleted, and notifies the correction program 90 of the ID number extracted. The correction program 90 having received the notification deletes the one of the determination rule 16 corresponding to the ID number.

FIG. 10 is a functional block diagram of the configuration of the software-maintenance-service providing device 11 of FIG. 9. For convenience in explanation, the same reference numerals are assigned to functions of FIG. 10 that play the same roles as these of the portions of the software-maintenance-service providing device 11 according to the first embodiment of FIG. 3, and detailed explanation thereof is omitted.

As shown in FIG. 10, the software-maintenance-service providing device 11 is different from that of the first embodiment in points such that the correction program 90 is further stored in the storage portion 34 and that a deletion-determination-rule ID number output portion 100 is further added to the control portion 35. The correction program 90 is a program to correct a program code of the server process software 14 having a security hole, and the administrator of the Web server device 10 can download the program through the software output portion 37 and execute it. The correction program 90 can also be installed from a portable recording medium such as a flexible disk (FD), CD-ROM, a DVD disk, a magneto-optical disk, and an IC card.

The correction program 90 has a function of deleting any one of the determination rule 16 that becomes unnecessary due to the correction of the program code, and makes an inquiry about an ID number of the determination rule to be deleted to the software-maintenance-service providing device 11 when the function is executed by the Web server device 10.

When accepting the inquiry about the ID number from the correction program 90, the deletion-determination-rule ID number output portion 100 of the control portion 35 extracts the ID number of the determination rule to be deleted that becomes unnecessary due to the installation of the correction program 90, and outputs the ID number extracted to the correction program 90.

The ID number of a determination rule to be deleted can be acquired in a specific manner as follows. The determination-rule retrieving portion 38 retrieves any ones of the determination rule 16 corresponding to the setup environment for the server process software 14 before and after the correction program 90 is installed, from the storage portion 34, and the deletion-determination-rule ID number output portion 100 extracts the ID number of a determination rule that is included in the determination rules corresponding to the setup environment before the installation of the correction program 90 and that is not included in the determination rules corresponding to the setup environment after the installation.

FIG. 11 is a functional block diagram of the configuration of the Web server device 10 of FIG. 9. The Web server device 10 of FIG. 11 has the correction program 90 installed on the HTTP server processor 59 of the control portion 55, which is different from that of the first embodiment.

The correction program 90 includes a deletion-determination-rule ID number acquiring portion 110 and a determination-rule deleting portion 111. The deletion-determination-rule ID number acquiring portion 110 makes an inquiry about an ID number of any one of the determination rule 16 that becomes unnecessary due to installation of the correction program 90, to the software-maintenance-service providing device 11, and acquires the ID number. The determination-rule deleting portion 111 deletes the one of the determination rule 16 having the ID number acquired by the deletion-determination-rule ID number acquiring portion 110.

FIG. 12 is a flowchart of the process procedures for a delete process of deleting a determination rule in the software-maintenance-service providing system according to the second embodiment. The Web server device 10 executes the correction program 90 (step S1201). Then, the correction program 90 transmits an ID-number notification request for any one of the determination rule 16 that becomes unnecessary as a result of execution of the correction program 90, to the software-maintenance-service providing device 11 (step S1202).

When receiving the ID-number notification request in a state of waiting for this notification request (step S1203), the software-maintenance-service providing device 11 requests the Web server device 10 so as to transmit information on the setup environment for the server process software 14 having a security hole (step S1204).

The Web server device 10 having accepted the request checks the setup environment (step S1205), and transmits information for the setup environment acquired through the check, to the software-maintenance-service providing device 11 (step S1206). Specifically, the setup environment can be checked by referring to a set file or so (e.g., the registry file in Microsoft Windows™) that describes the setup environment for the software.

The software-maintenance-service providing device 11 accepts the information for the setup environment transmitted from the Web server device 10 after installation of the correction program 90 (step S1207), and retrieves a determination rule corresponding to the setup environment after the installation (step S1208). The software-maintenance-service providing device 11 further retrieves a determination rule corresponding to the setup environment before the correction program 90 is installed (step S1209).

Then, the software-maintenance-service providing device 11 extracts an ID number of any one of the determination rule 16, as an ID number of any one of the determination rule 16 to be deleted. The one of the determination rule 16 having the ID number extracted is included in those in the determination rule 16 corresponding to the setup environment before the installation of the correction program 90 and is not included in those in the determination rule 16 corresponding to the setup environment after the installation (step S1210).

The software-maintenance-service providing device 11 notifies the correction program 90 for the Web server device 10 of the ID number of one of the determination rule 16 extracted that is to be deleted (step S1211). The correction program 90 having received the notification refers to the ID number and deletes the unnecessary one of the determination rule 16 (step S1212).

FIG. 13 is a diagram of an example of a screen displayed on the Web server device 10 when the ID number of one of the determination rule 16 to be deleted is transmitted to the Web server device 10 of FIG. 11. As shown in FIG. 13, when the ID number of one of the determination rule 16 to be deleted is transmitted to the Web server device 10, a message indicating the setup environment after the correction program 90 is executed and a message indicating that transmission of the ID number of one of the determination rule 16 to be deleted is completed are displayed on the screen of the Web server device 10. The administrator of the Web server device 10 can confirm the messages thereon.

According to the second embodiment as explained above, when the security hole is solved as a result of execution of the correction program 90, the correction program 90 transmits an ID-number notification request for an unnecessary one of the determination rule 16 to the software-maintenance-service providing device 11. The software-maintenance-service providing device 11 extracts the ID number of the unnecessary one of the determination rule 16 and notifies the correction program 90 of the ID number extracted, and the correction program 90 deletes the one of the determination rule 16 having the ID number notified. Therefore, the number of determination rules in the determination rule 16 referred to by the filtering software 15 can be reduced, and the filtering software can efficiently determine whether the HTTP request is allowed or denied.

FIG. 14 is a diagram of the hardware configuration of the software-maintenance-service providing device 11 according to the first and the second embodiments. The software-maintenance-service providing device 11 includes a main body 140, a display 141 for displaying information such as an image on a display screen by an instruction from the main body 140, a keyboard 142 for entering various pieces of information into the software-maintenance-service providing device 11, and a mouse 143 for specifying an arbitrary position on the display screen of the display 141.

The main body 140 of the software-maintenance-service providing device 11 includes CPU 148, RAM 149, ROM 150, a hard disk drive (HDD) 151, a CD-ROM drive 152 for inserting CD-ROM, an FD drive 153 for inserting a flexible disk (FD), and an I/O interface 154 connected to the display 141, the keyboard 142, and the mouse 143. The main body 140 also includes a LAN interface 155 connected to a local area network or a wide area network (LAN/WAN).

In the first embodiment, the hard disk drive 151 stores the server process software 14, the filtering software 15, the determination rule 16, and the setup-environment support information 36. According to the second embodiment, the hard disk drive 151 further stores the correction program 90.

Connected to the software-maintenance-service providing device 11 are a modem 144 for connecting it to a public line 156 such as the Internet 13, and another computer system (PC) 145, a server 146, and a printer 147 or the like through the LAN interface 155 and LAN/WAN.

The server process software 14, the filtering software 15, the determination rule 16, and the correction program 90 are downloaded to the Web server device 10 through the LAN interface 155 or the modem 144. A new determination rule can be added to the determination rule 16 by an input through the keyboard 142, an input from CD-ROM by the CD-ROM drive 152, an input from a flexible disk by the FD drive 153, an input through the LAN interface 155 via LAN/WAN, and an input through the modem 144 via the public line 156. When the new determination rule is added to the determination rule 16, the CPU 148 performs the process for updating the setup-environment support information 36.

FIG. 15 is a diagram of the hardware configuration of the Web server device 10 according to the first embodiment and the second embodiment. For convenience in explanation, the same reference numerals are assigned to components of FIG. 15 that play the same roles as these of the components of FIG. 14, and detailed explanation thereof is omitted.

According to the first embodiment, the hard disk drive (HDD) 151 of the main body 140 for the Web server device 10 stores the server process software 14, the filtering software 15, and the determination rule 16 which are downloaded through the LAN interface 155 via LAN/WAN or through the modem 144 via the public line 156. According to the second embodiment, the hard disk drive (HDD) 151 stores another server process software obtained through correction of the server process software 14 according to the first embodiment by the correction program 90 that is downloaded via the LAN/WAN or the public line 156.

Although the embodiments of the present invention have been explained so far, the present invention may be executed in different embodiments other than the embodiments within the scope of the technological idea described in claims.

For example, the second embodiment indicates the case where the software having the security hole is the server process software 14, but target software may be any software if it accepts an input from the outside of the software. Furthermore, the fault in the software is not limited to the security hole that is used for unauthorized access, and therefore, the fault may also be an error (bug) in a program code for software caused by an input by a user himself/herself of the software.

The filtering software 15 according to the second embodiment determines whether the HTTP request is allowed or denied, but the present invention is not limited thereto. Therefore, all inputs to the software having the fault can be targeted. The inputs include an input according to any protocol such as file transfer protocol (FTP) and simple mail transfer protocol (SMTP), and an input through "telnet".

Furthermore, in the second embodiment, denying the input is instructed using the instruction "deny" when the determination criteria are satisfied based on the data structure of the determination rule of FIG. 2, but allowing the input may also be instructed using an instruction "allow" when the determination criteria are satisfied.

According to the second embodiment, the software vendor creates and provides the filtering software 15 and the determination rule 16, but as shown in the following, a third party other than the software vendor may create and provide them.

FIG. 16 is a diagram of an overall system configuration of a software-maintenance-service providing system in which a third party provides the filtering software 15. The software-maintenance-service providing system as shown in FIG. 16 is a system in which a third party creates the filtering software 15 and a software-maintenance-service providing device 160 of the third party provides the filtering software 15 created to the server process software 14 having a security hole, while the software vendor creates the determination rule 16 referred to by the filtering software 15 and the software-maintenance-service providing device 11 of the software vendor provides the determination rule 16 created thereto.

Reversing the above procedures although they are not shown in the figure, the software-maintenance-service providing system may be a system in which the software vendor creates the filtering software 15 and the software-maintenance-service providing device 11 of the software vendor provides it, and the third party creates the determination rule 16 and the software-maintenance-service providing device 160 of the third party provides it.

FIG. 17 is a diagram of an overall system configuration of a software-maintenance-service providing system in which a third party provides the filtering software 15 and the determination rule 16. The software-maintenance-service providing system as shown in this figure is a system in which a third party creates the filtering software 15 and the determination rule 16 referred to by the filtering software 15 and the software-maintenance-service providing device 160 of the third party provides them to the server process software 14.

Figure 18:
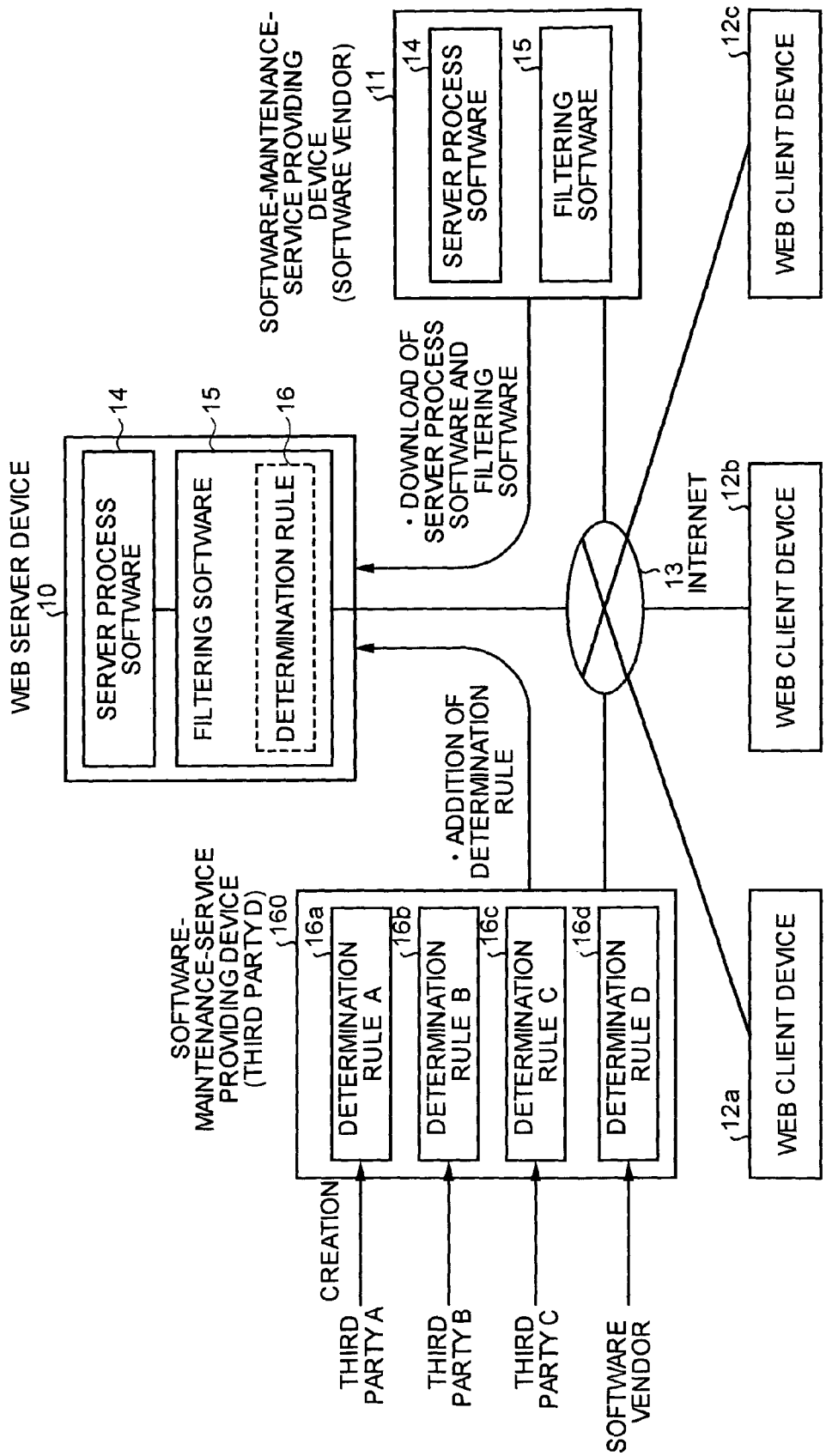
FIG. 18 is a diagram of an overall system configuration of a software-maintenance-service providing system in which a software vendor and a plurality of third parties provide determination rules.

FIG. 18 is a diagram of an overall system configuration of a software-maintenance-service providing system in which a software vendor and a plurality of third parties provide determination rules. The software-maintenance-service providing system as shown in this figure is a system in which a plurality of third parties A to C and the software vendor create determination rules A to D (16a to 16d), respectively, and the software-maintenance-service providing device 160 of a third party D provides them to the server process software 14.

In this case, the filtering software 15 may be created by any one of the third parties A to D or by the software vendor, and the software-maintenance-service providing device 160 capable of downloading the determination rules A to D (16a to 16d) may be provided in any one of the third parties A to D or in the software vendor.

Of the processes explained in the second embodiment, the whole or a part of the processes that is explained as the process automatically performed can be performed manually, or the whole or a part of the processes that is explained as the process manually performed can also be performed automatically using a known method. In addition to these, the information including the process procedures, the control procedures, the specific names, the various data, and the parameters as shown in the document and the drawings can be arbitrarily changed unless otherwise specified.

The components of the devices shown in the figures are functional concepts, and therefore, they are not necessarily configured physically as shown in the figures. In other words, forms specifically configured due to distributions and integrations of the devices are not limited by those as shown in the figures. Therefore, the whole or a part of the devices can be configured by functionally or physically distributing and integrating them by arbitrary units according to various loads and their use patterns. Furthermore, the whole or any part of the processing functions performed by the devices is realized by a CPU and a program that is analyzed and executed by the CPU, or can be realized as hardware provided by a wired logic.

The software-maintenance-service providing method explained in the second embodiment can be realized by executing a previously prepared program by a computer such as a personal computer and a work station. The program can be distributed through a network such as the Internet. The program can also be executed by being recorded on a computer-readable recording medium such as a hard disk, a flexible disk (FD), CD-ROM, MO, and DVD, and by being read from the recording medium by the computer.

As explained above, according to the present invention, when any fault is found in the software used by the user, by quickly and efficiently providing the determination rule that specifies determination criteria on denial or allowance of an input to the software, to the user, it is possible to quickly prevent occurrence of damage to the user due to the fault before a correction program to correct the fault is released.

According to the present invention, when any fault is found in the software used by the user, it is possible to provide only a necessary determination rule out of a plurality of determination rules, and efficiently detect an input that may cause trouble by reducing the number of determination rules that are referred to in the terminal device side and deny the input.

According to the present invention, a security hole is found in the software used by the user. In this case, by quickly and efficiently providing a determination rule that is referred to for determining whether an input to the software is denied, to the user, it is possible to quickly prevent occurrence of damage to the user due to the security hole.

According to the present invention, it is possible to provide a determination rule that is necessary and sufficient for the setup environment for the software used by the user, and efficiently detect an input that may cause trouble by reducing the number of determination rules that are referred to in the terminal device side, and deny the input.

According to the present invention, it is possible to provide a determination rule that is necessary and sufficient for types and/or versions of software having a fault used by the user and of another software required for an operation of the software, and by reducing the number of determination rules that are referred to in the terminal device side, it is possible to efficiently detect an input that may cause trouble and deny the input.

According to the present invention, by deleting a determination rule that becomes unnecessary due to installation of the correction program and reducing the number of determination rules that are referred to in the terminal device side, it is possible to efficiently detect an input that may cause trouble and deny the input.

According to the present invention, by deleting a determination rule that becomes unnecessary due to installation of the correction program corresponding to the setup environment for the software and reducing the number of determination rules that are referred to in the terminal device side, it is possible to efficiently detect an input that may cause trouble and deny the input.

According to the present invention, by deleting a determination rule that becomes unnecessary due to installation of the correction program corresponding to the setup environment including at least information for types and/or versions of software having any fault and of another software required for an operation of the software, and by reducing the number of determination rules that are referred to in the terminal device side, it is possible to efficiently detect an input that may cause trouble and deny the input.

According to the present invention, the terminal device enables to efficiently acquire a latest determination rule from the software-maintenance-service providing device at a preset time, determine whether an input to the software having the fault is to be denied by referring to the determination rule acquired, and prevent occurrence of damage to the user due to the fault.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A system for providing software maintenance service for faulty software installed in a client connected to a server via a network, wherein
    the server includes
        a storage unit that stores at least one of a plurality of first determination rules for determining whether to deny a process request to the faulty software;
        a transmitting unit that transmits the at least one of the first determination rules to the client;
        an extracting unit that extracts, when a correction program for the faulty software is executed on the client, a second determination rule that becomes unnecessary due to an execution of the correction program from among the first determination rules based on a setup environment of the faulty software, the second determination rule being included in the first determination rules, and the setup environment including a type or a version of the faulty software or other software required for an execution of the faulty software; and
        a notifying unit that notifies the client of the second determination rule, and the client includes
        a determination-rule receiving unit that receives the at least one of the first determination rules;
        a process-request receiving unit that receives the process request;
        a determining unit that determines whether to deny the process request based on the at least one of the first determination rules; and
        a deleting unit that deletes the second determination rule from the first determination rules.

2. The system according to claim 1, wherein the server further includes a retrieving unit that retrieves the at least one of the first determination rules from the storage unit.

3. The system according to claim 2, wherein the retrieving unit retrieves the at least one of the first determination rules based on a setup environment for the faulty software.

4. The system according to claim 3, wherein the setup environment includes a type or a version of the faulty software or other software required for an execution of the faulty software.

5. The system according to claim 1, wherein when the faulty software shows a fault regarding to a security hole, the determining unit determines to deny a process request exploiting the security hole.

6. The system according to claim 1, wherein the client further includes a requesting unit that requests, at a predetermined time, the server to transmit the at least one of the first determination rules to the client.

7. A method of providing software maintenance service for faulty software installed in a client connected to a server via a network, the method comprising:
    transmitting including the server transmitting at least one of a plurality of first determination rules for determining whether to deny a process request to the faulty software to the client;
    extracting including the server extracting, when a correction program for the faulty software is executed on the client, a second determination rule that becomes unnecessary due to an execution of the correction program, from among the first determination rules based on a setup environment of the faulty software, the second determination rule being included in the first determination rules, and the setup environment including a type or a version of the faulty software or other software required for an execution of the faulty software;

receiving including the client receiving the at least one of the first determination rules;

receiving including the client receiving the process request;

notifying including the server notifying the client of the second determination rule; and deleting including the client deleting the second determination rule from the first determination rules; and determining including the client determining whether to deny the process request based on the at least one of the first determination rules.

8. A computer-readable recording medium that stores a computer program for a server that provides software maintenance service for faulty software installed in a client connected to the server via a network, wherein the computer program causes the server to execute transmitting at least one of a plurality of first determination rules for determining whether to deny a process request to the faulty software to the client, extracting, when a correction program for the faulty software is executed on the client, a second determination rule that becomes unnecessary due to an execution of the correction program, from among the first determination rules based on a setup environment of the faulty software, the second determination rule being included in the first determination rules, and the setup environment including a type or a version of the faulty software or other software required for an execution of the faulty software, and notifying the client of the second determination rule.

* * * * *